United States Patent
Lin et al.

(10) Patent No.: US 11,747,671 B1
(45) Date of Patent: Sep. 5, 2023

(54) DISPLAY DEVICE ENABLING EXTERNAL OBJECTS TO BE SHOWN THEREIN

(71) Applicant: HIGGSTEC INC., Yilan County (TW)

(72) Inventors: Tzu-Chien Lin, Yilan County (TW); Chun-Wei Yeh, Yilan County (TW); Hung-Yu Tsai, Yilan County (TW)

(73) Assignee: HIGGSTEC INC., Su'ao Township (TW)

( * ) Notice: Subject to any disclaimer, the term of this patent is extended or adjusted under 35 U.S.C. 154(b) by 0 days.

(21) Appl. No.: 17/900,399

(22) Filed: Aug. 31, 2022

(51) Int. Cl.
    *G02F 1/1335* (2006.01)
    *G02F 1/13357* (2006.01)
    *G02F 1/1333* (2006.01)

(52) U.S. Cl.
    CPC .... *G02F 1/133553* (2013.01); *G02F 1/13338* (2013.01); *G02F 1/133308* (2013.01); *G02F 1/133602* (2013.01); *G02F 2203/01* (2013.01)

(58) Field of Classification Search
    CPC ......... G02F 1/133553; G02F 1/133308; G02F 1/13338; G02F 1/133602; G02F 2203/01; G09F 13/04; G09F 13/0404; G09F 13/08; G09F 13/10; G09F 13/12; F21V 33/00; A47F 3/001
    See application file for complete search history.

(56) References Cited

U.S. PATENT DOCUMENTS

| | | | | |
|---|---|---|---|---|
| 9,753,341 B1* | 9/2017 | Streibig | ..................... | H04N 5/66 |
| 2013/0107160 A1* | 5/2013 | Kim | .......................... | G09F 9/35 |
| | | | | 445/24 |
| 2016/0220039 A1* | 8/2016 | Chang | ....................... | G09F 9/35 |
| 2017/0031081 A1* | 2/2017 | Lee | .......................... | A47F 3/005 |
| 2018/0084924 A1* | 3/2018 | Sun | .......................... | A47F 11/06 |
| 2018/0164030 A1* | 6/2018 | Lee | ....................... | F25D 23/025 |
| 2021/0233898 A1* | 7/2021 | Okuda | .................... | H01L 27/32 |
| 2022/0022667 A1* | 1/2022 | Dubugnon | ........... | H05B 47/115 |

FOREIGN PATENT DOCUMENTS

| | | |
|---|---|---|
| CN | 103576357 B | 12/2016 |
| CN | 105940441 B | 10/2018 |
| CN | 106133587 B | 3/2020 |
| TW | I610116 | 1/2018 |

\* cited by examiner

*Primary Examiner* — Zheng Song
(74) *Attorney, Agent, or Firm* — Muncy, Geissler, Olds & Lowe, P.C.

(57) ABSTRACT

A display device enabling external objects to be shown therein comprises a main body formed with a space, a backlight module disposed in the space and a display module disposed in the space. The backlight module comprises a light projection surface, the display and backlight modules are separately disposed by a spacing for at least one external object to locate therein. The display module comprises a transparent display structure, a first optical film disposed on one side of the transparent display structure facing the surface, and a second optical film disposed on the other side. The first optical film enables a light projected by the backlight module and a light reflected by the main body to pass through. The second optical film enables a light from the transparent display structure to pass through, and reflects an ambient light outside the main body.

7 Claims, 8 Drawing Sheets

DISPLAY DEVICE ENABLING EXTERNAL OBJECTS TO BE SHOWN THEREIN

FIELD OF THE INVENTION

The invention relates to a display device, and more particularly to a display device enabling external objects to be shown therein.

BACKGROUND OF THE INVENTION

In the field of display devices, most of them are implemented as transparent display structures, such as those disclosed in CN 105940441B, CN 103576357B, CN 106133587B, TW 1610116 and U.S. Pat. No. 9,753,341B, but the existing display devices generally only provide the display function through transparent display structures, and cannot provide showing function at the same time.

At present, display devices are generally implemented in a stacked structure, that is, the backlight module, the display structure, and the polarizing structure are closely arranged in sequence, resulting in the conventional structure being incapable of providing room for disposing external objects and showing function. When the conventional display device is provided for external objects to be disposed therein, the distance between the backlight module and the display structure will be lengthened, causing the light transmittance of the conventional display device to be insufficient, and the external objects cannot be clearly shown. In addition, when the existing display device is implemented with a mirror effect, because the display device is limited by high brightness and high transmittance, the mirror effect is compromised; on the contrary, if the mirror effect is maintained, the brightness of the display device will be affected.

Although US 2013107160A discloses a technology for disposing external objects therein and capable of being used as a display for external objects, in order to avoid the aforementioned defect of insufficient light transmittance, and also to prevent the light projected by the backlight module from being blocked by external objects, US 2013107160A is required to dispose a light source additionally for the external objects. In addition, US 2013107160A did not disclose that the display device has a mirror effect, or did not disclose a solution for improving the problem that the display device is incapable of enhancing the transmittance and retaining the mirror effect.

SUMMARY OF THE INVENTION

A main object of the invention is to solve the problem of a reduced light transmittance when conventional display devices are provided for disposing external objects.

Another object of the invention is to solve the problem that conventional display devices are incapable of improving a light transmittance and retaining a mirror effect.

In order to achieve the above objects, the invention provides a display device enabling external objects to be shown therein comprising a main body, a backlight module, and a display module. The main body is formed with a space. The backlight module is disposed in the space. The display module is disposed in the space. The backlight module includes a light projection surface. The display module and the backlight module are separately disposed by a spacing. A length of the spacing is sufficient for at least one external object to be located therein. The display module comprises a transparent display structure, a first optical film disposed on one side of the transparent display structure facing the light projection surface, and a second optical film disposed on one side of the transparent display structure distant from the light projection surface. The first optical film is disposed for a light directly projected by the backlight module and a light reflected by the main body to pass through. The second optical film is disposed for a light from the transparent display structure to pass through, and reflects an ambient light outside the main body.

In one embodiment, the main body includes a plurality of inner walls that define the space with the display module jointly, and at least one of the plurality of inner walls is provided with a reflective layer.

In one embodiment, the plurality of inner walls are provided with the reflective layer, respectively.

In one embodiment, the display module comprises a touch panel disposed on one side of the display module distant from the backlight module.

In one embodiment, the second optical film is located between the transparent display structure and the touch panel.

In one embodiment, the spacing is less than or equal to 35 cm.

In one embodiment, a light transmittance of the second optical film is 80%, and an ambient light reflectance of the second optical film is at least 60%.

Through the aforementioned implementation of the invention, compared with the prior art, the display device of the invention has the following features: the display device of the invention is not implemented in a closely stacked structure, the spacing is provided between the display module and the backlight module, so that the external object can be disposed therein. At the same time, the first optical film of the invention enables a light directly projected by the backlight module to pass through, and can also recover a reflected light, thereby achieving a brightening effect, and the second optical film has a function of reflecting the ambient light, thereby enabling the invention to produce a mirror effect.

DETAILED DESCRIPTION OF THE PREFERRED EMBODIMENTS

Figure 1:
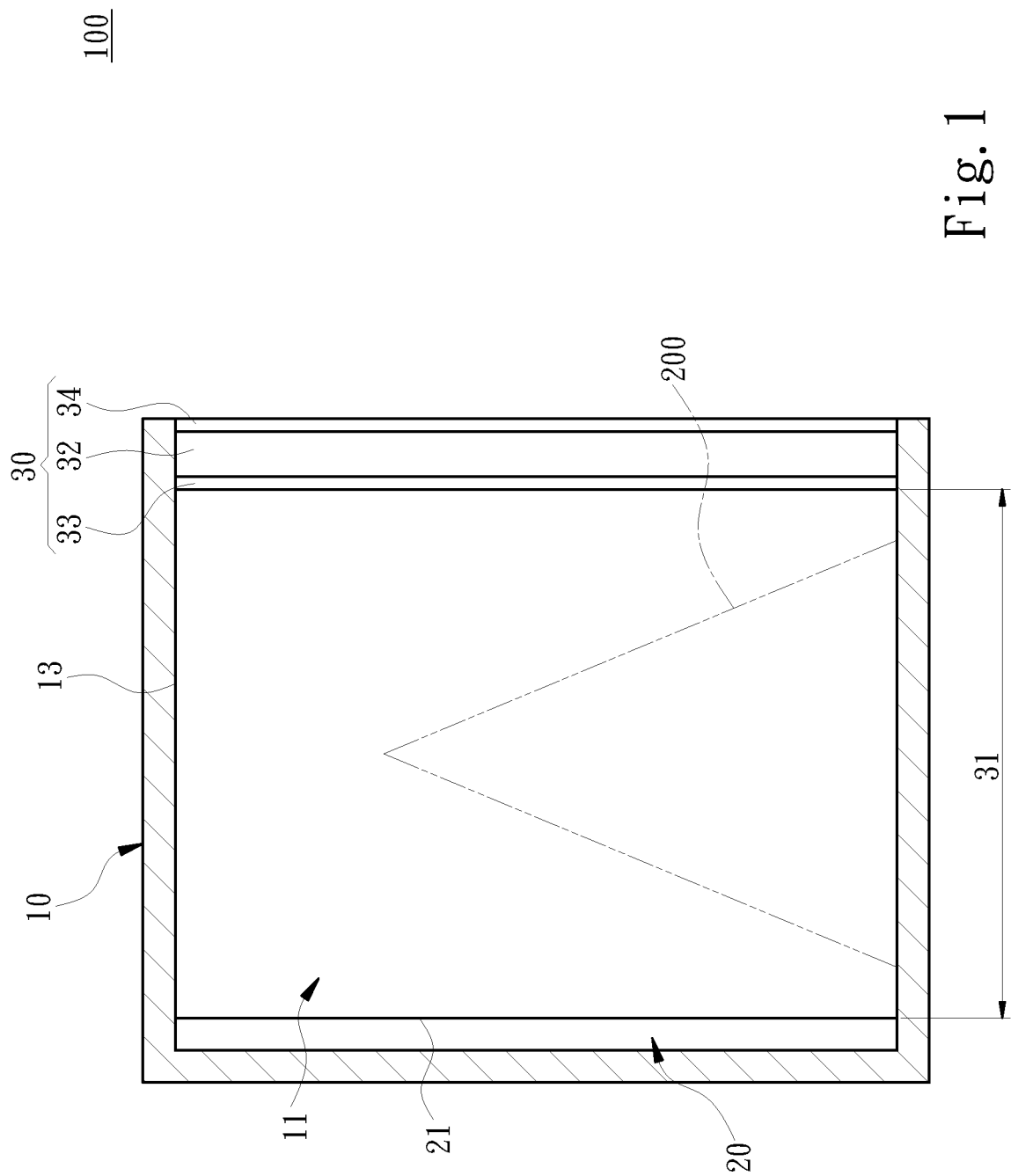
FIG. 1 is a cross-sectional view of a structure of a first embodiment of the invention.
Figure 2:
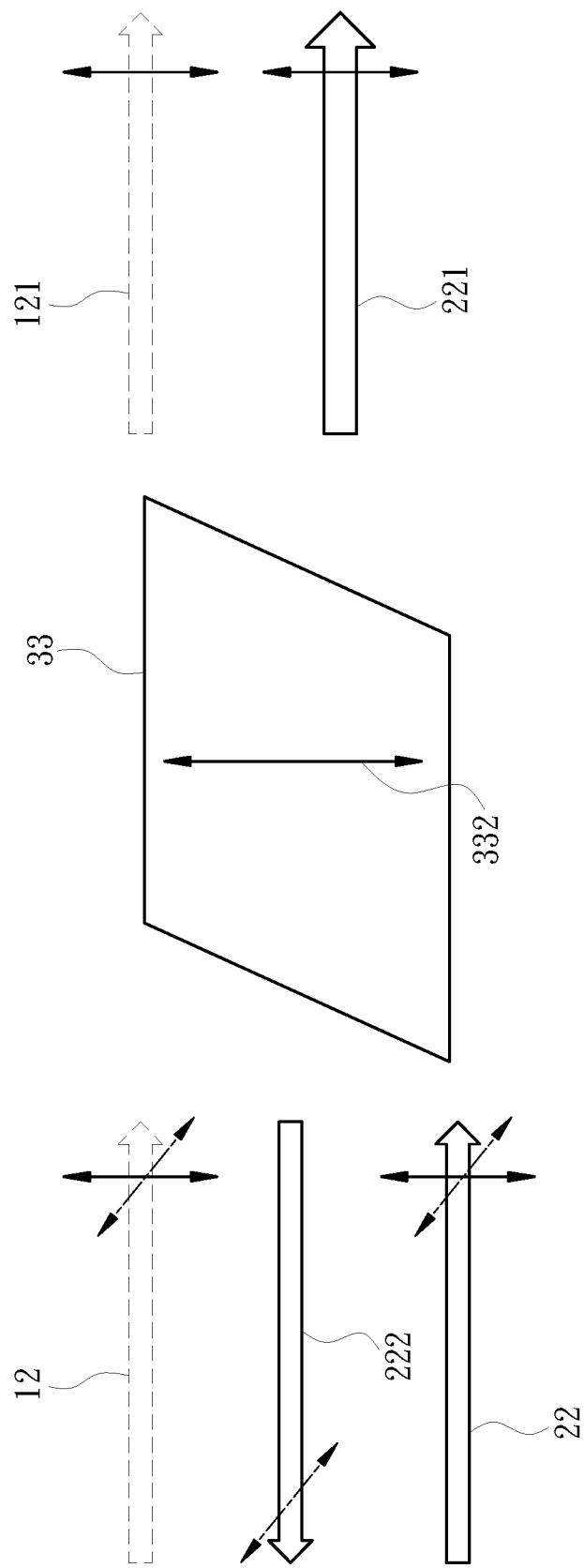
FIG. 2 is a schematic diagram of implementation of a first optical film of the first embodiment of the invention.
Figure 3:
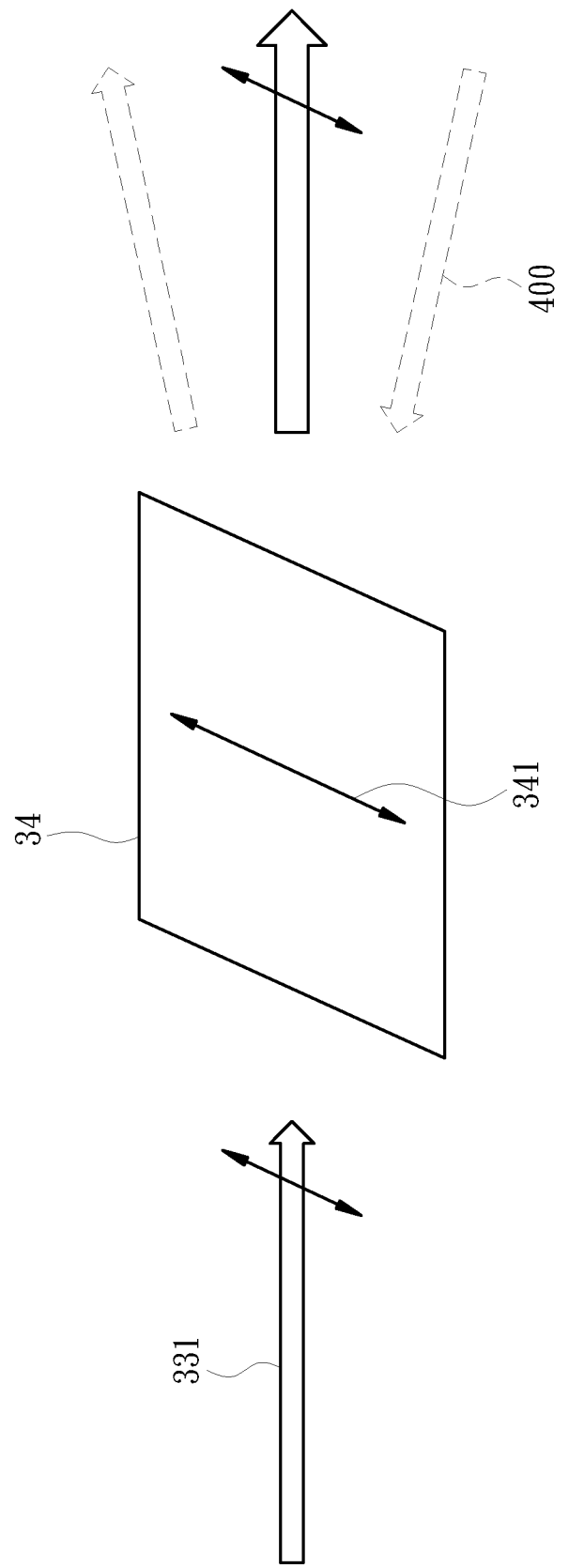
FIG. 3 is a schematic diagram of implementation of a second optical film of the first embodiment of the invention.

The detailed description and technical content of the invention are described below with reference to the accompanying drawings.

Please refer to FIG. 1, FIG. 2, FIG. 3, FIG. 4 and FIG. 5, the invention provides a display device 100 enabling at least one external object 200 to be shown therein, and improving light transmittance and reflectance. The display device 100 comprises a main body 10, a backlight module 20, and a display module 30. The main body 10 serves as a casing of the display device 100 and forms a space 11, and the space 11 provides with the backlight module 20 and the display module 30 to be disposed therein. The backlight module 20 comprises a light projection surface 21, and the light projection surface 21 is capable of projecting a backlight ray 22 outward when the backlight module 20 is activated. The display module 30 is located at one side of the backlight module 20 and is separated from the backlight module 20 to be disposed by a spacing 31. A separation arrangement described herein is not referred to a spacing formed when the display device 100 is disassembled, but the display module 30 is not disposed adjacent to the backlight module 20. After the display device 100 is assembled, the spacing 31 exists between the display module 30 and the backlight module 20.

In order to provide a showing function for the display device 100, the spacing 31 is designed to provide the at least one external object 200 to be disposed therein. A length of the spacing 31 must be sufficient for the at least one external object 200 to be located therein, namely, a length of the spacing 31 must be greater than or equal to a length of the at least one external object 200 to accommodate the at least one external object 200. In addition, the display module 30 comprises a transparent display structure 32, a first optical film 33, and a second optical film 34. The transparent display structure 32 determines an operation of the display module 30, and the transparent display structure 32 is capable of changing polarization directions of light based on a conductive state. Taking an example of the transparent display structure 32 with liquid crystal display for illustration, the transparent display structure 32 comprises two transparent electrodes arranged at intervals, and a liquid crystal molecular layer located between the two transparent electrodes. The liquid crystal molecular layer contains a plurality of liquid crystal molecules. When the two transparent electrodes are electrically conducted, the plurality of liquid crystal molecules are affected by an external electric field, which changes an original arrangement of the plurality of liquid crystal molecules, and further changes the polarization directions of light. On the contrary, when the two transparent electrodes are not electrically conducted, the plurality of liquid crystal molecules are restored to the original arrangement, and the polarization directions of light cannot be changed. It should be understood that the transparent display structure 32 of the invention is not limited by the foregoing embodiment, any transparent display structure that can determine a working state of the display device 100 should belong to the scope of the invention.

The first optical film 33 is located on one side of the display module 30 facing the light projection surface 21, and the first optical film 33 provides a polarization function. In detail, the first optical film 33 receives the backlight ray 22 from the backlight module 20 and comprises a first polarization axis 332. The first optical film 33 receives the backlight ray 22 with a polarization direction the same as that of the first polarization axis 332 (such as a reference numeral 221) to pass through, and rejects the backlight ray 22 with a polarization direction different from that of the first polarization axis 332 (such as a reference numeral 222) to pass through. For example, when the first polarization axis 332 is assumed to be vertical, the backlight ray 22 with a vertical polarization direction is capable of passing through the first optical film 33, and the backlight ray 22 with other polarization directions is incapable of passing through the first optical film 33. In addition, the first optical film 33 also receives a reflected ray 12 reflected by the main body 10. The reflected ray 12 can be formed by transforming from the backlight ray 22. When the backlight ray 22 travels toward the display module 30, a part of the backlight ray 22 may be blocked by the first optical film 33 to be reflected, or may be reflected by the at least one external object 200, and the part of the backlight ray 22 is reflected on the main body 10 and scattered. The backlight ray 22 reflected becomes an unpolarized ray when the backlight ray 22 is reflected by the main body 10 again, the backlight ray 22 is transformed into the reflected ray 12. It can be known from the foregoing that the reflected ray 12 with a polarization direction the same as that of the first optical film 33 (such as a reference numeral 121) is capable of passing through the first optical film 33, and the reflected ray 12 with other polarization directions different from that of the first optical film 33 are incapable of passing through the first optical film 33. A part of the reflected ray 12 incapable of passing through the first optical film 33 will be reflected to the main body 10 again, and after being scattered, the reflected ray 12 will be reflected to the first optical film 33 again, and this cycle is repeated. Accordingly, the first optical film 33 of the invention not only receives the backlight ray 22 from the backlight module 20, but also receives the backlight ray 22 that fails to penetrate the first optical film 33 (such as the reference numeral 222) and the backlight ray 22 reflected by the at least one external object 200, so as to improve a light output efficiency of the backlight module 20 and achieve a brightening effect.

The second optical film 34 is located on one side of the display module 30 distant from the light projection surface 21. The second optical film 34 is opposite to the first optical film 33, and the second optical film 34 also provides a polarization function. Specifically, the second optical film 34 receives a light from the display module 30 to pass through. The light can be generated by the display module 30 itself, or can be formed by transforming from a polarized ray 331 of the first optical film 33 received by the display module 30. It should be noted that the polarized ray 331 in the invention refers to a light ray from the first optical film 33, including at least one of the backlight ray 22 with a polarization direction the same as that of the first polarization axis 332 (such as the reference numeral 221), and the reflected ray 12 with a polarization direction the same as that of the first optical film 33 (such as the reference numeral 121). In one embodiment, the second optical film 34 comprises a second polarization axis 341 perpendicular to the first polarization axis 332. When a light of the display module 30 is formed by transforming from the polarized ray 331, the second polarization axis 341 prevents the polarized ray 331 of the first optical film 33 from passing through before the display module 30 is electrically conducted. When the display module 30 is electrically conducted, since a polarization direction of the polarized ray 331 is changed, the polarized ray 331 is capable of penetrating the second optical film 34. In addition, after the second optical film 34 receives an ambient light 400 outside the main body 10, the second optical film 34 can further reflect the ambient light 400 of the main body 10, thereby the display device 100 producing a mirror effect. In one embodiment, a light transmittance of the second optical film 34 is 80%, and an ambient light reflectance is at least 60%.

Figure 5:
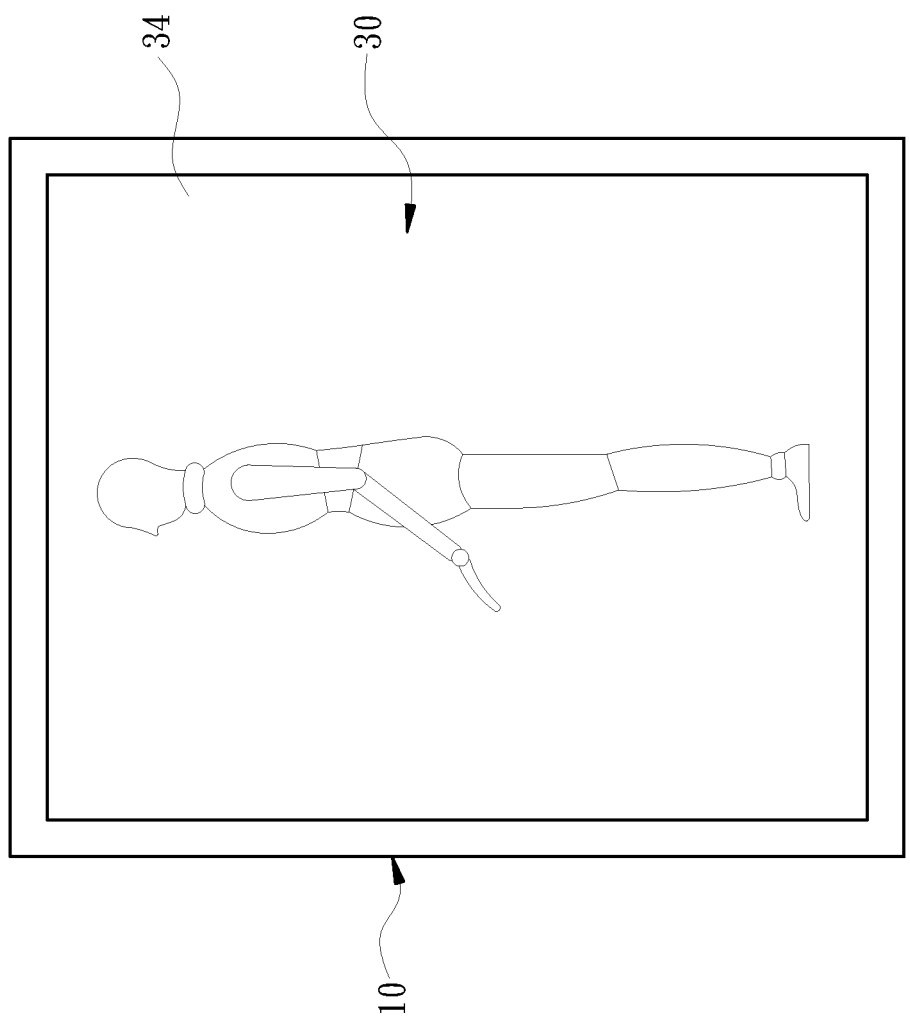
FIG. 5 is a schematic diagram of a mirror function of the first embodiment of the invention.

Implementation of the display device 100 will be described as follows. Assuming initially that the backlight module 20 generates the backlight ray 22, but the transparent display structure 32 is not electrically conducted, the backlight ray 22 travels toward the display module 30 at the time, and the part of the backlight ray 22 is blocked by the at least one external object 200 and reflected to the main body 10, and the other part of the backlight ray 22 is not blocked by the at least one external object 200 and travels directly toward the first optical film 33. The first optical film 33 receives the backlight ray 22 with a polarization direction the same as that of the first polarization axis 332 (such as the reference numeral 221) and the reflected ray 12 with a polarization direction the same as that of the first polarization axis 332 (such as the reference numeral 121) to pass through. The backlight ray 22 with a polarization direction the same as that of the first polarization axis 332 (such as the reference numeral 221) and the reflected ray 12 with a polarization direction the same as that of the first polarization axis 332 (such as the reference numeral 121) are transformed into the polarized ray 331. At this moment, since the transparent display structure 32 is not electrically conducted, the polarized ray 331 is incapable of changing a polarization direction and incapable of passing through the second optical film 34, so that the display device 100 presents a black screen and is incapable of showing the at least one external object 200. At the same time, when the display device 100 presents a black screen, the second optical film 34 can still reflect the ambient light 400 and maintain a reflectance of at least 60%, as shown in FIG. 5. Wherein FIG. 5 shows a mirror function of the display device 100 when it is not electrically conducted, that is, a portrait in this figure is a mirror image displayed by a user on the display device 100.

Figure 4:
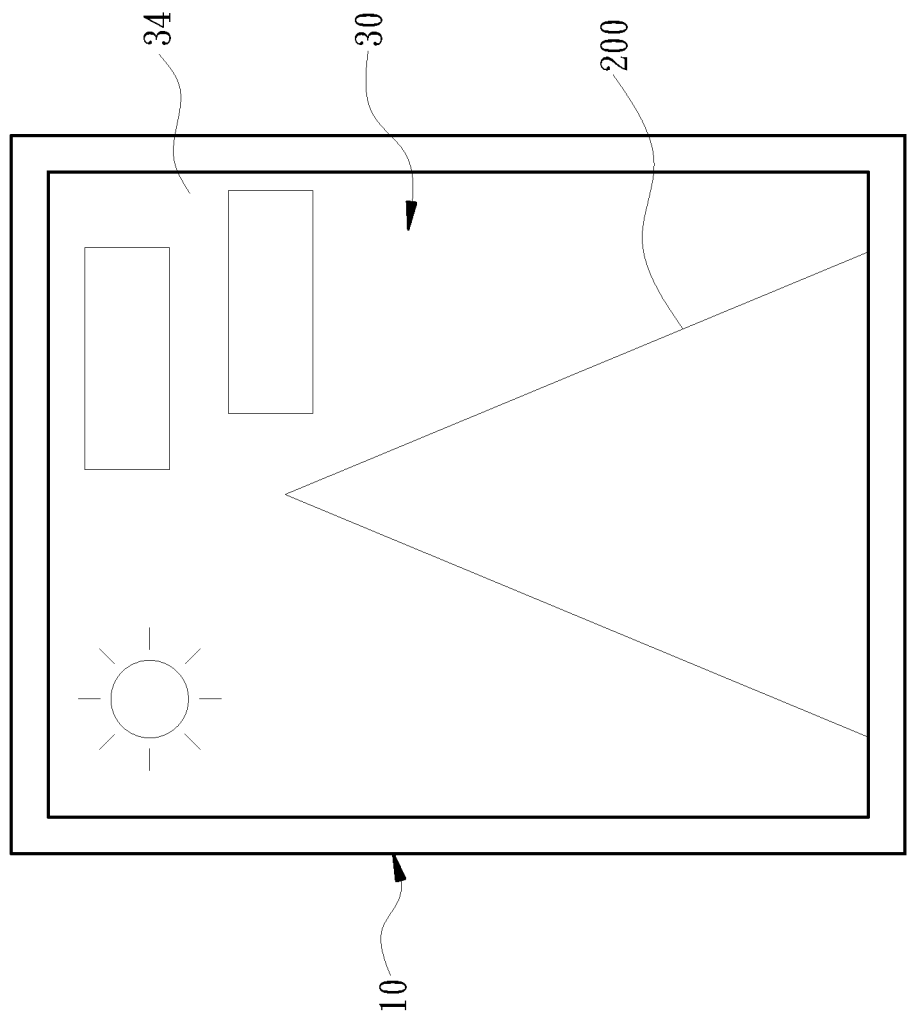
FIG. 4 is a schematic diagram of a showing function of the first embodiment of the invention.

Once the transparent display structure 32 is electrically conducted, a polarization direction of the polarized ray 331 can be changed, and is capable of passing through the second optical film 34, so that the display device 100 can present a bright screen, and the at least one external object 200 can be shown, as shown in FIG. 4. Wherein the display device 100 of FIG. 4 is capable of showing the at least one external object 200, and information representing in the form of a sun image and block patterns displayed by the transparent display structure 32. It should be understood that although the mirror function of the display device 100 is not shown in FIG. 4, after the display device 100 is electrically conducted, the second optical film 34 also maintains a function of reflecting the ambient light 400 and produces the display device 100 with a mirror effect.

It can be known from the above that the display device 100 of the invention is not implemented in a closely stacked structure, and the spacing 31 exists between the display module 30 and the backlight module 20 so that the at least one external object 200 can be disposed therein. At the same time, a light directly projected by the backlight module 20 passes through the first optical film 33 of the invention, and the first optical film 33 can also recover the reflected light, thereby achieving a brightening effect, and the second optical film 34 is further provided with the function of reflecting the ambient light 400, thereby enabling the invention to produce a mirror effect. The invention solves the problem that a reflectance has to be compromised upon increasing a light transmittance, or a light transmittance has to be decreased upon increasing a reflectance in the conventional display devices.

Figure 6:
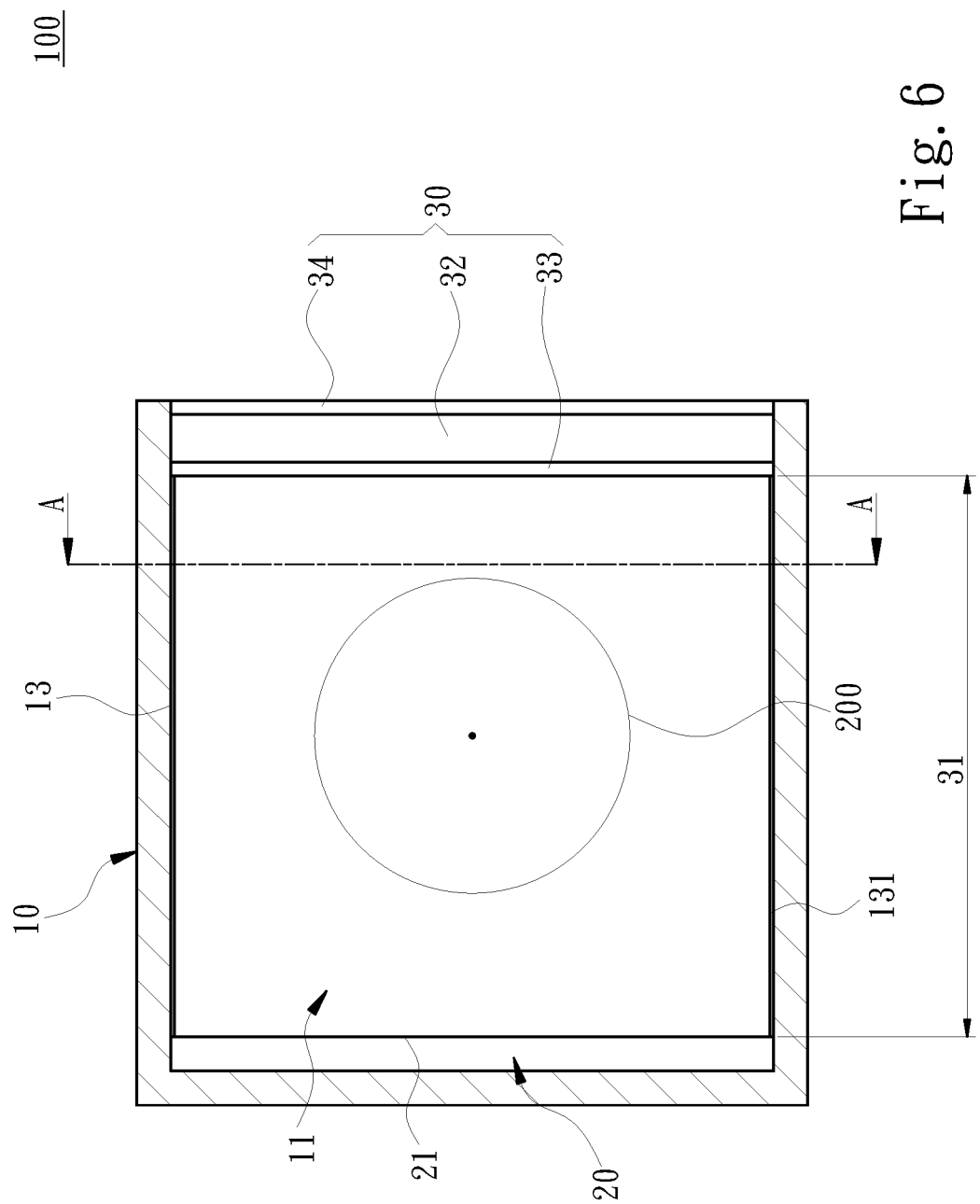
FIG. 6 is a top view of a structure of a second embodiment of the invention.
Figure 7:
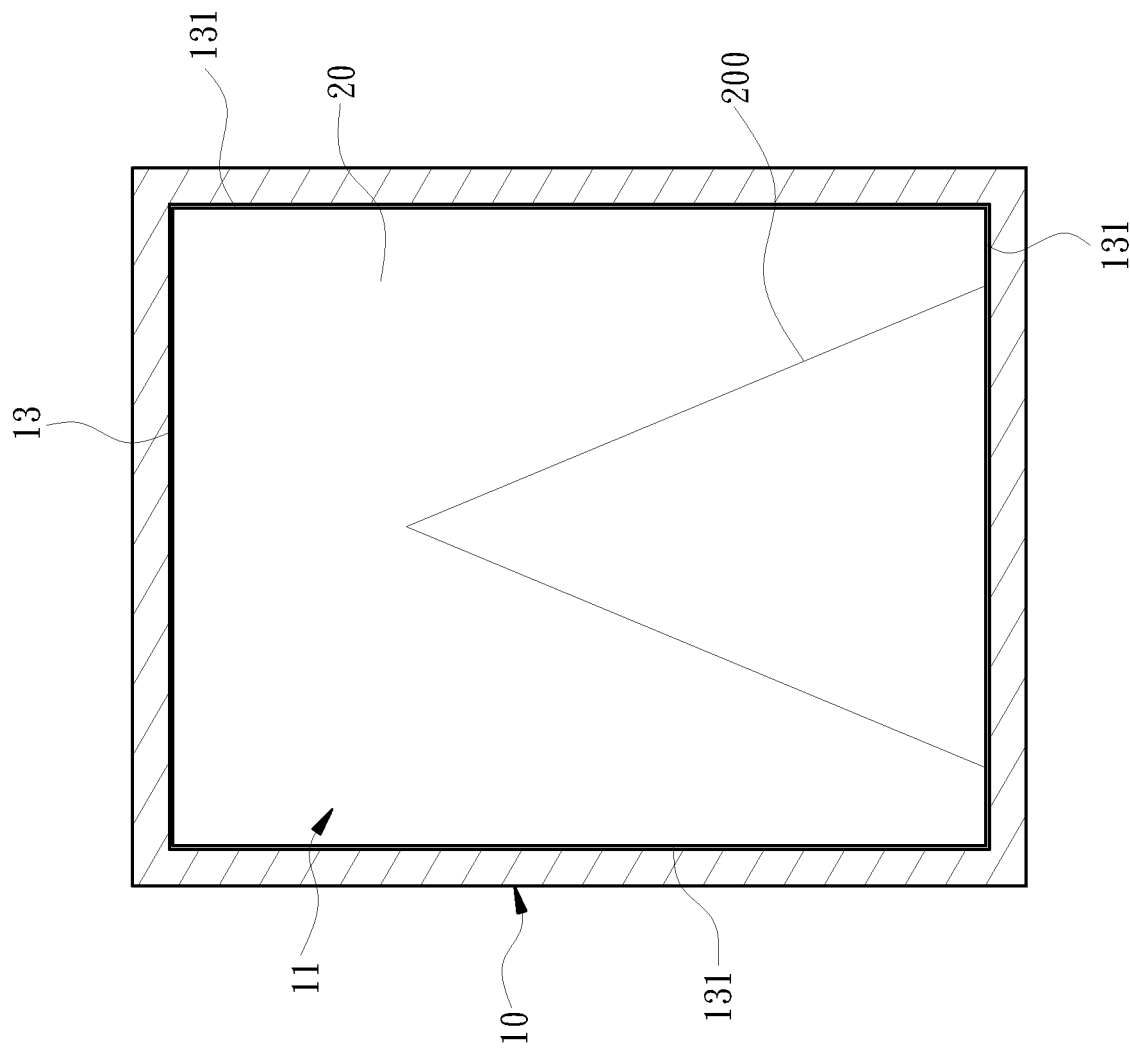
FIG. 7 is a cross-sectional view along the A-A section line of FIG. 6.

Please refer to FIG. 6 and FIG. 7. In one embodiment, the main body 10 comprises a plurality of inner walls 13, the plurality of inner walls 13 and the display module 30 define the space 11 jointly. In order for the plurality of inner walls 13 to achieve a reflection effect, at least one of the plurality of inner walls 13 can also be provided with a reflective layer 131, the reflective layer 131 reflects a light from the at least one external object 200 or the first optical film 33, for example, the reflective layer 131 can be white paint coated or mirror coated. In addition to the above, in the invention, the reflective layer 131 can be provided on each of the plurality of inner walls 13, thereby enhancing a reflective capability of the main body 10. Furthermore, in the invention, in order to prevent the backlight ray 22 from being incapable of providing illumination for the at least one external object 200, the spacing 31 between the backlight module 20 and the display module 30 is less than or equal to 35 cm.

Figure 8:
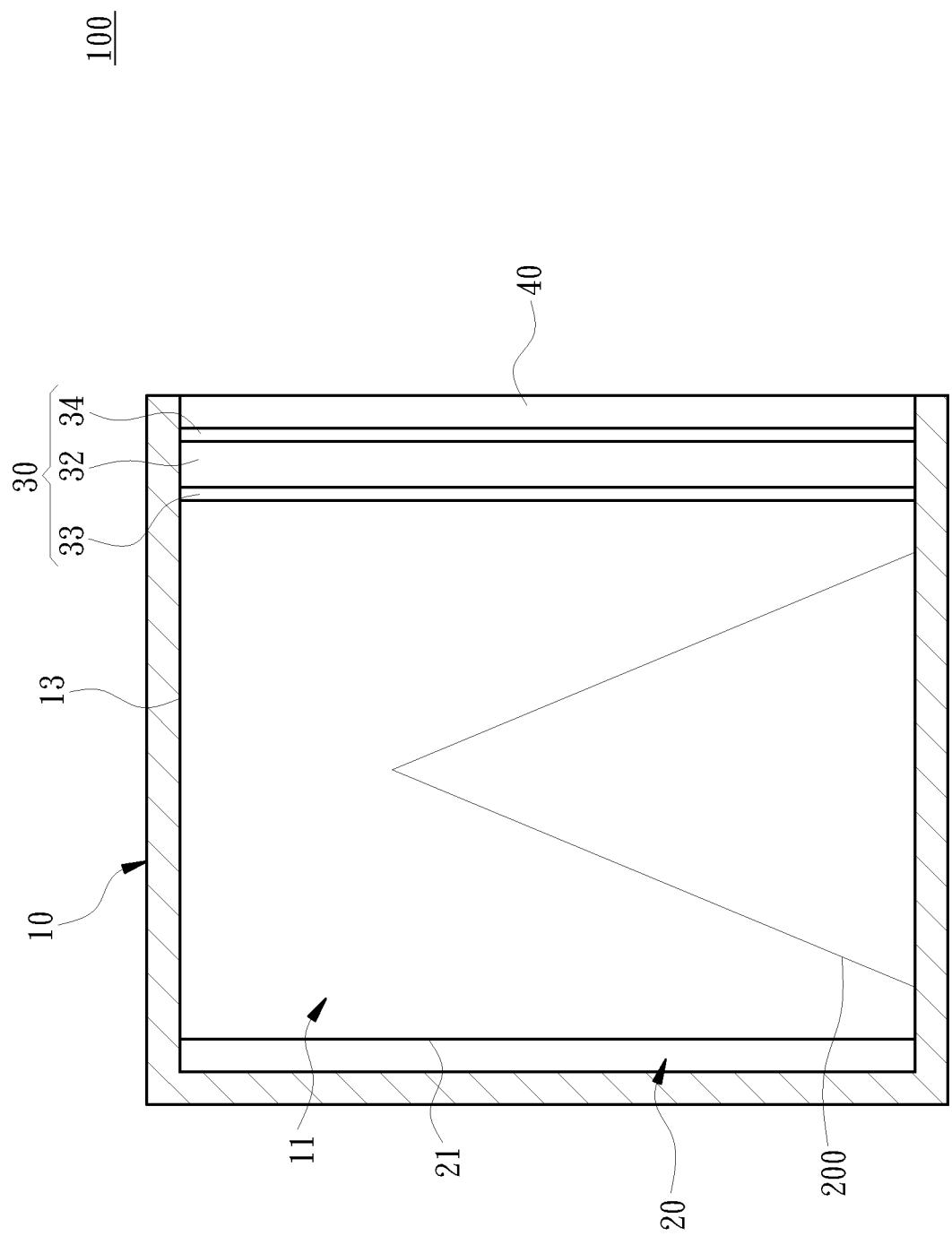
FIG. 8 is a cross-sectional view of a structure of a third embodiment of the invention.

On the other hand, please refer to FIG. 8, in one embodiment, the display device 100 can further have a touch function, the display module 30 comprises a touch panel 40, and the touch panel 40 is disposed on one side of the display module 30 distant from the backlight module 20. The touch panel 40 can provide control by touching based on quantum tunneling, capacitance, resistance, etc. A user touches the touch panel 40 to generate a signal change, thereby achieving an object of control. Further, in this embodiment, the second optical film 34 is disposed between the transparent display structure 32 and the touch panel 40.

What is claimed is:

1. A display device enabling external objects to be shown therein, comprising:
   a main body formed with a space;
   a backlight module disposed in the space and comprising a light projection surface; and
   a display module disposed in the space, and disposed separately from the backlight module by a spacing, a length of the spacing being sufficient for at least one external object to be located therein, and the display module comprising a transparent display structure, a first optical film disposed on one side of the transparent display structure facing the light projection surface, and a second optical film disposed on one side of the transparent display structure distant from the light projection surface,
   wherein the first optical film is provided with a polarization function and comprises a first polarization axis; the first optical film is disposed for a light directly projected by the backlight module with a polarization direction same as the first polarization axis and a light reflected by the main body with a polarization direction same as the first polarization axis passing through; and the first optical film is disposed for reflecting a light directly projected by the backlight module with a polarization direction different from the first polarization axis and a light reflected by the main body with a polarization direction different from the first polarization axis, and wherein the second optical film is disposed for a light from the transparent display structure passing through, and the second optical film reflects an ambient light outside the main body.

2. The display device enabling external objects to be shown therein as claimed in claim 1, wherein the main body comprises a plurality of inner walls that define the space with the display module jointly, and at least one of the plurality of inner walls is provided with a reflective layer.

3. The display device enabling external objects to be shown therein as claimed in claim 2, wherein the plurality of inner walls are provided with the reflective layer, respectively.

4. The display device enabling external objects to be shown therein as claimed in claim 1, wherein the display module comprises a touch panel disposed on one side of the display module distant from the backlight module.

5. The display device enabling external objects to be shown therein as claimed in claim 4, wherein the second optical film is located between the transparent display structure and the touch panel.

6. The display device enabling external objects to be shown therein as claimed in claim 1, wherein the spacing is less than or equal to 35 cm.

7. The display device enabling external objects to be shown therein as claimed in claim 1, wherein a light transmittance of the second optical film is 80%, and an ambient light reflectance of the second optical film is at least 60%.

* * * * *